United States Patent
Otomo (10) Patent No.: US 12,434,144 B2
(45) Date of Patent: Oct. 7, 2025

(54) RECORDING MEDIUM AND INFORMATION PROCESSING DEVICE THAT PRESENT INFORMATION FOR UTILIZING UPDATED CONTENTS

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 295 days.

(21) Appl. No.: 18/135,193

(22) Filed: Apr. 17, 2023

(65) Prior Publication Data
US 2023/0249072 A1 Aug. 10, 2023

Related U.S. Application Data

(63) Continuation of application No. PCT/JP2021/038009, filed on Oct. 14, 2021.

(30) Foreign Application Priority Data

Oct. 21, 2020 (JP) ................. 2020-176865

(51) Int. Cl.
*A63F 13/69* (2014.01)
*A63F 13/533* (2014.01)
*A63F 13/825* (2014.01)

(52) U.S. Cl.
CPC ............ *A63F 13/533* (2014.09); *A63F 13/69* (2014.09); *A63F 13/825* (2014.09)

(58) Field of Classification Search
None
See application file for complete search history.

(56) References Cited

FOREIGN PATENT DOCUMENTS

| JP | 6389345 B2 | 9/2018 |
| JP | 2020-74925 A | 5/2020 |
| JP | 2020-116175 A | 8/2020 |

OTHER PUBLICATIONS

YouTube video, "Old Evolution vs New Evolution! ★ New Pokemon Go Update Gameplay! ★ Pokemon Go Evolution Spree!"—https://www.youtube.com/watch?v=H_MXV7gUnnw, Reversal, Oct. 11, 2016 (Year: 2016).*
Pokemon Go Wiki "Evolution"—https://web.archive.org/web/20200928003359/https://pokemongo.fandom.com/wiki/Evolution, Sep. 28, 2020 (Year: 2020).*

(Continued)

*Primary Examiner* — Damon J Pierce
(74) *Attorney, Agent, or Firm* — Osha Bergman Watanabe & Burton LLP (57) ABSTRACT

A non-transitory computer readable recording medium storing instructions that present, to a user, predetermined information necessary for utilizing updated contents provided by an information processing device, the instructions causing a computer to execute: extracting, from among possessed contents, an existing content to which an evolved content will be added through a game update, wherein the evolved content is an evolution destination of the existing content; acquiring, as the predetermined information, a cost required to evolve the existing content into the evolved content; and upon determining a lack of the cost in the possessed contents, displaying a notification screen that indicates the lack of the cost.

8 Claims, 8 Drawing Sheets

(56) References Cited

OTHER PUBLICATIONS

Pokemon Go Wiki "Candy"—https://web.archive.org/web/20201001172750/https://pokemongo.fandom.com/wiki/Candy, Oct. 1, 2020 (Year: 2020).*
WO2020153445a1, English Translation, Otomo, Jul. 30, 2020 (Year: 2020).*
International Search Report issued in corresponding International Application No. PCT/JP2021/038009 mailed Dec. 14, 2021 (5 pages).
English Translation of the Written Opinion of the International Searching Authority issued in corresponding International Application No. PCT/JP2021/038009 mailed Apr. 21, 2023 (4 pages).

* cited by examiner

RECORDING MEDIUM AND INFORMATION PROCESSING DEVICE THAT PRESENT INFORMATION FOR UTILIZING UPDATED CONTENTS

BACKGROUND

Technical Field

The present invention relates to a recording medium storing instructions and an information processing device.

Description of Related Art

Games in which base content (fusion source content) is evolved by fusing an evolution resource that has been associated with the base content in advance are well known.

In relation to this, Patent Literature 1 discloses a technique in which, when a new evolution destination (evolved content) is added to a player's possessed content through a version upgrade (update), the player is notified that the new evolution destination has been added.

PATENT LITERATURE

Patent Literature 1: Japanese Patent No. 6,389,345

However, with the technique described in Patent Literature 1, even though there is a notification that a new evolution destination has been added to the possessed content, the player may not possess the cost required for evolution (evolution resource content, coins, etc.), and sometimes the possessed content cannot be instantly evolved into a new evolution destination.

SUMMARY

One or more embodiments of the present invention provide a technological improvement over such conventional technologies as discussed above. In particular, one or more embodiments of the present invention provide a recording medium storing instructions and an information processing device which present, to a user, predetermined information (e.g., a value or cost) necessary for utilizing updated contents (e.g., evolved contents) provided by an information processing device. As a result, for example, in the event that a new evolution destination (e.g., an evolved content) is added to a possessed content through a game update, the possessed content can be instantly evolved into the new evolution destination. This provides a practical, technological improvement over conventional technologies that would be readily appreciated by those skilled in the art, as will be discussed in further detail later.

According to a first aspect of the present invention, there is provided a non-transitory computer readable recording medium storing instructions that present, to a user, predetermined information necessary for utilizing updated contents provided by an information processing device, the instructions causing a computer to execute: extracting, from among possessed contents, an existing content to which an evolved content will be added through a game update, the evolved content being an evolution destination of the existing content, acquiring, as the predetermined information, a cost required to evolve the existing content into the evolved content, and upon determining a lack of the cost in the possessed contents, displaying a notification screen that indicates the lack of the cost.

According to a second aspect of the present invention, there is provided a non-transitory computer readable recording medium storing instructions that present, to a user, predetermined information necessary for utilizing updated contents provided by an information processing device, the instructions causing a computer to execute: for extracting, from among possessed contents, an existing content to which an evolved content will be added through a game update, the evolved content being an evolution destination of the existing content, acquiring, as the predetermined information, a cost required to evolve the existing content into the evolved content, and displaying, prior to the game update, a notification screen that includes a message recommending the user to play a game event in which the user can earn the cost.

According to a third aspect of the present invention, the cost includes an evolution resource content.

According to a fourth aspect of the present invention, the notification screen includes an instruction area that receives an instruction to transit to a play screen of a game event in which the user can earn the evolution resource content.

According to a fifth aspect of the present invention, the notification screen includes an area indicating that the evolution resource content is required to evolve the existing content.

According to a sixth aspect of the present invention, the notification screen includes an area indicating that the evolution resource content is required to evolve at least one of the possessed contents.

According to a seventh aspect of the present invention, the instructions cause the computer to execute: upon determining a lack of the evolution resource content in the possessed contents, causing the notification screen to indicate the lack of the evolution resource content.

According to an eighth aspect of the present invention, the evolution resource content in the possessed content has a specific parameter that rises once a homologous content is fused, and the instructions cause the computer to execute: under a condition that the specific parameter is lower than a value required for the evolving, causing the notification screen to indicate a lack of the specific parameter.

According to a ninth aspect of the present invention, there is provided an information processing device that provides updated contents and presents, to a user, predetermined information necessary for utilizing the updated contents, the information processing device comprising: a control device that executes: extracting, from among possessed content, an existing content to which an evolved content will be added through a game update, the evolved content being an evolution destination of the existing content, acquiring, as the predetermined information, a cost required to evolve the existing content into the evolved content, and upon determining a lack of the cost in the possessed contents, displaying a notification screen that indicates the lack of the cost.

According to a tenth aspect of the present invention, there is provided an information processing device that provides updated contents and presents, to a user, predetermined information necessary for utilizing the updated contents, the information processing device comprising: a control device that executes: extracting, from among possessed content, an existing content to which an evolved content will be added through a game update, the evolved content being an evolution destination of the existing content, acquiring, as the predetermined information, a cost required to evolve the existing content into the evolved content, and displaying, prior to the game update, a notification screen that includes a message recommending the user to play a game event in which the user can earn the cost.

According to an eleventh aspect of the present invention, the instructions cause the computer to execute: causing, prior to the game update, the notification screen to notify the user of the cost.

In this way, one or more embodiments provide a practical improvement for effective utilization of the updated contents provided by the information processing device. With one or more embodiments of the present invention, for example, when a new evolution destination is added to a player's possessed content through a game update, that possessed content can be instantly evolved into the new evolution destination.

DETAILED DESCRIPTION

Embodiments of the present invention will now be described with reference to the appended drawings. To facilitate understanding of the description, components and steps that are the same will be numbered the same as much as possible in the drawings, and redundant description will be omitted.

Overall Configuration

Figure 1:
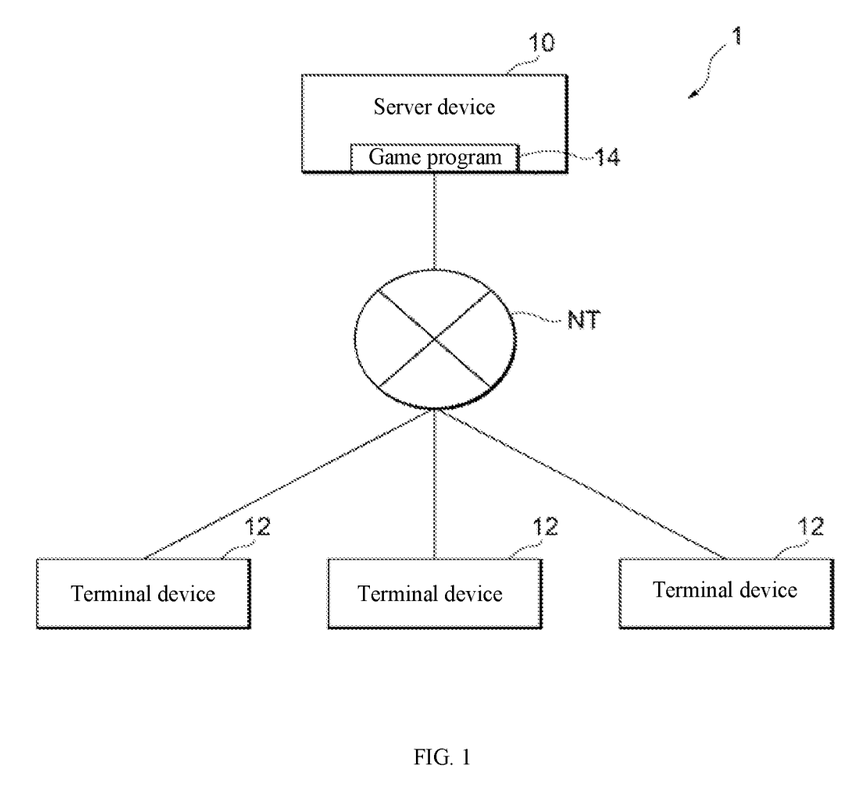
FIG. 1 is a block diagram showing an example of the overall configuration of a game system according to one or more embodiments.

FIG. 1 is a block diagram showing an example of the overall configuration of a game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing instructions such as a game program 14, or the instructions such as the game program 14 itself, to the player of each terminal device 12 via the communication network NT. In one or more embodiments, the server device 10 provides the game program 14 itself to the players of the terminal devices 12.

Each terminal device 12 is an information processing device such as a game device belonging to a player, and is an information processing device that provides a game to a player by executing the game program 14 received from the server device 10 after the program has been installed. Examples of these terminal devices 12 include video game machines, arcade game machines, mobile phones, smartphones, tablets, personal computers, and various other such devices.

Hardware Configuration

Figure 2:
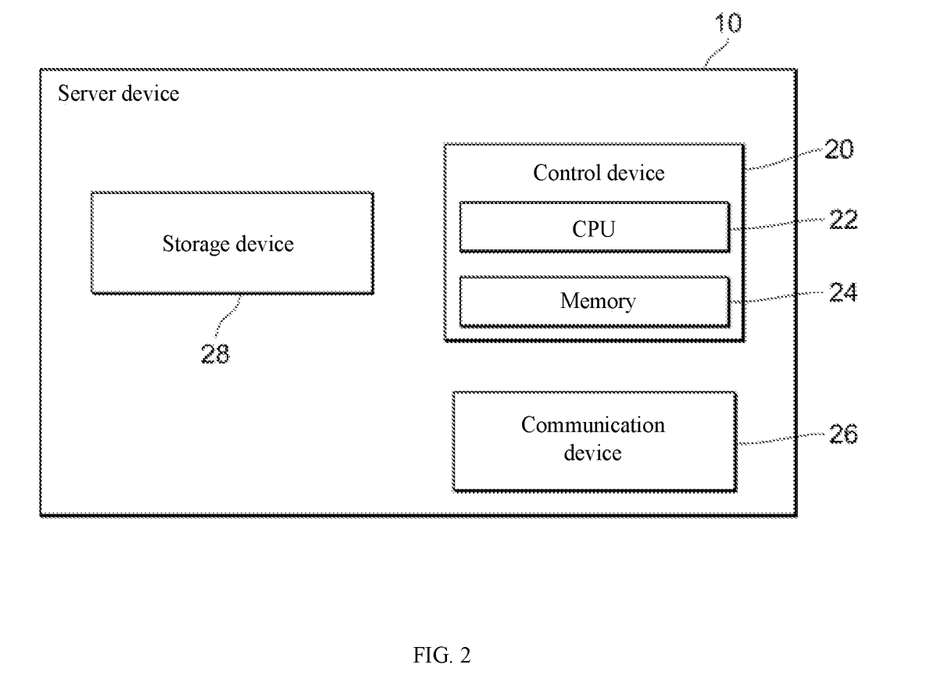
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing instructions such as specific programs stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of instructions such as programs and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising operation means, a display device, and a sound output device, for example.

Figure 3:
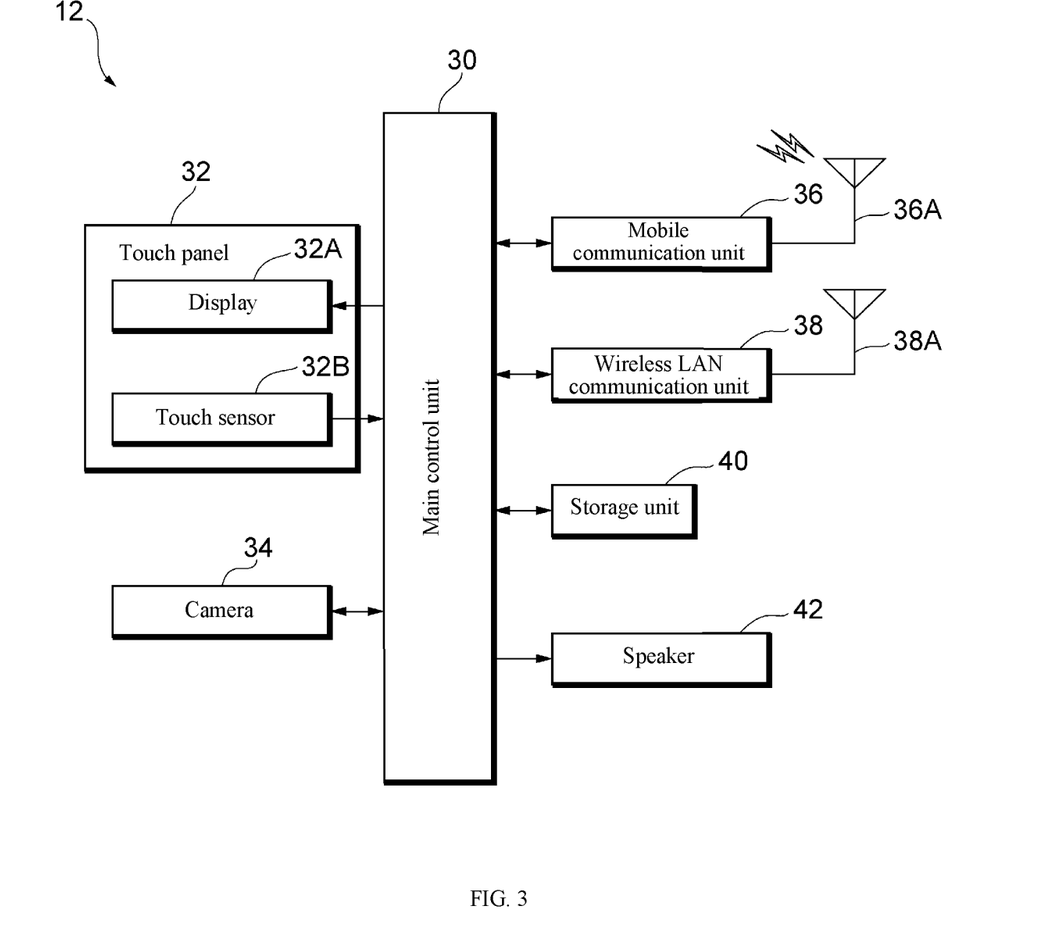
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of instructions such as programs and data, including the game program 14 and play data indicating player information or the progress of the game in the game program 14. This play data may be stored in the server device 10.

The speaker 42 has the function of outputting game sounds and so forth.

Game Overview

The game according to one or more embodiments includes game events such as lottery games and quests in which a player can earn characters (an example of content), and fusion games in which the earned characters are strengthened or evolved. These lottery games are sometimes referred to as gacha (loot box), raffle, summoning, or the like. These quests are sometimes referred to as a battle games, dungeons, searches, missions, or the like.

A lottery game according to one or more embodiments is a game in which a player is allowed to earn one or more randomly selected characters from the lottery target character group, in accordance with an instruction (request) from a player to execute a lottery game. This lottery is executed on the basis of consumption of items possessed by the player. Examples of these items include charged items (paid stones, paid tickets, etc.) and non-charged items (free stones, free tickets, etc.). A charged item is a paid item granted to the player on the basis of a payment made with money, prepaid card, credit card, or the like. Also, a non-charged item is a free item given to the player in the game. A non-charged item has the same value as, for example, a charged item.

Also, a quest according to one or more embodiments is a game in which a team composed of one or more characters possessed by a player and enemy characters play against each other on the basis of an instruction (request) from the player to execute the quest. These quests are executed on the basis of the consumption of the current stamina associated with the player. The player can acquire a clearance reward by clearing a quest. Examples of clearance rewards include non-charged items (free stones, free tickets, etc.), coins, enemy characters (evolution resource characters) that appear in quests, player experience points for raising the player rank, and so on.

A fusion game according to one or more embodiments is a game in which a resource character (resource content) is fused with a base character (base content). In a fusion game, strengthening fusion is performed, as a first character fusion, in which the ability parameters of the base character are changed by consuming a certain number of coins and a resource character arbitrarily selected by the player. In this first character fusion, if the base character and the resource character are homologous characters, strengthening fusion is performed in which at least a specific parameter of the base character is changed (increased). These specific parameters may include, for example, the skill level, the awakening level, and luck. On the other hand, in the first character fusion, if the base character and the resource character are not homologous characters, strengthening fusion is performed in which at least a level of the base character is changed (increased), but a specific parameter is not changed (increased). Homologous characters refers to characters having the same character ID as another character, or characters representing different stages of evolution (evolution series). For example, a character K and a character N obtained by evolving the character K three times are homologous characters. An evolution resource character (evolution resource content; discussed below) can be a base character or a resource character in the first character fusion. That is, the evolution resource character has a specific parameter that changes (increases) when the homologous characters are fused.

For example, if the player arbitrarily selects a base character and a resource character from his possessed characters in the strengthening fusion menu in a game, the player can request strengthening fusion on the condition that the player possesses a specific number of coins.

Also, with the fusion game according to one or more embodiments, evolution fusion is performed, as a second character fusion, in which a base character is evolved into a different character (evolved content) by consuming a cost associated with that base character in advance.

For example, when the player arbitrarily selects a base character from his possessed characters in an evolution fusion menu in the game, the player can request evolution fusion on the condition that the player possesses the cost associated with the base character in advance.

Also, with the game according to one or more embodiments, new characters (content) are added through a game update. This game update is sometimes called a version upgrade or a version update. A new character ID that is different from that of existing characters is given to these new characters.

For example, after the game has been updated, the player can possess (earn) a new character added through this game update by means of a lottery game, a quest, or second character fusion (evolution fusion).

Functional Units

Figure 4:
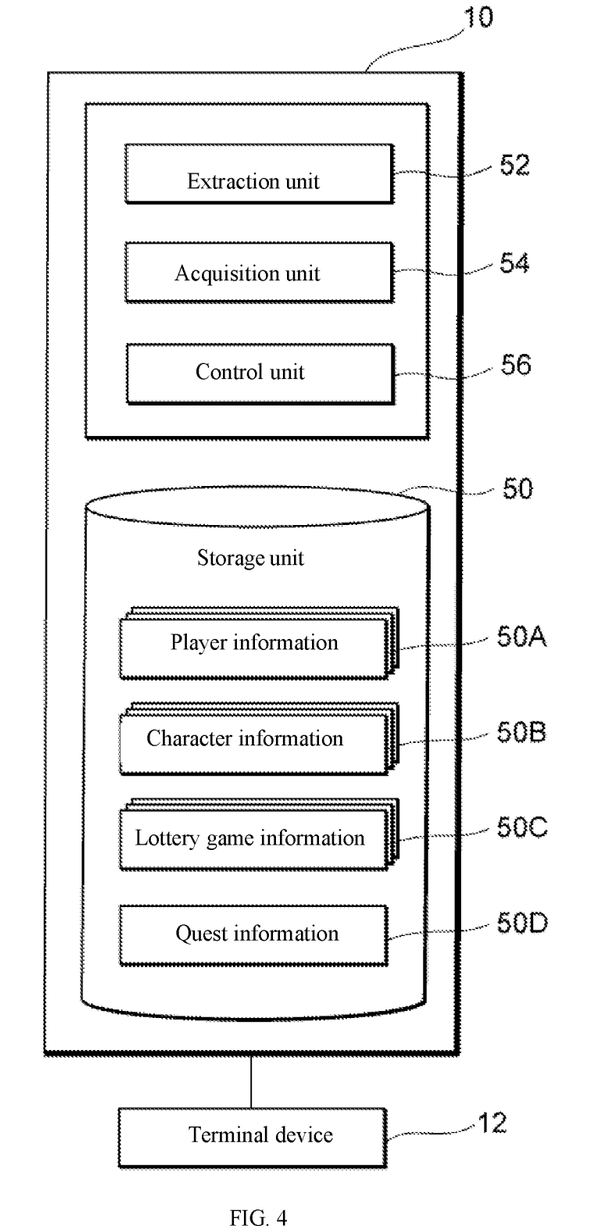
FIG. 4 is a block diagram schematically showing an example of the functional units of a server device.

FIG. 4 is a block diagram showing an example of the functional configuration of the server device 10.

As shown in FIG. 4, the server device 10 comprises, as functional components, a storage unit 50, an extraction unit 52, an acquisition unit 54, and a control unit 56. The storage unit 50 is realized in the form of one or more storage devices 28. Functional units other than the storage unit 50 are realized when the control device 20 executes the game program 14 stored in the storage device 28 or the like.

The storage unit 50 has the function of storing player information 50A, character information 50B, lottery game information 50C, quest information 50D, and the like.

Player information 50A is stored for each player in association with the player ID of that player. This player information 50A includes, for example, the player's name, age, player rank, possessed content information, stamina information, and so on.

Possessed content information includes possessed character information, possessed item information, possessed coin information, and so forth that are possessed by the player. Possessed character information includes the character ID of each character possessed by the player, and the ability parameters (level, specific parameter, hit points, attack power, defense power, etc.) of each character. Possessed item information includes the item ID and number of each item possessed by the player. These items include paid stones, paid tickets, free stones, free tickets, stamina recovery items, and the like. Possessed coin information includes the number of coins possessed by the player.

Stamina information includes the player's current stamina value and stamina upper limit value. The current stamina value is a value consumed when the player executes various quests. This current stamina value increases by a specific amount (such as 1) after a certain period of time (such as 3 minutes) elapses, and recovers to the stamina upper limit value. Also, this current stamina value is recovered beyond the stamina upper limit value when the player consumes paid stones, free stones, stamina recovery items, and so on. This stamina upper limit value increases along with the player rank. The player rank increases, for example, when the player gains player experience points by clearing quests.

Character information 50B is stored for each character in association with the character ID of that character. The character information 50B includes, for example, the character name and image, ability parameter information, rarity, and evolution fusion information. This character information 50B is updated from time to time by the game operator.

Ability parameter information includes the initial values and maximum values for the various ability parameters of a character.

Rarity may be represented by a number from 1 to 6, for example. This number may be indicated, for example, by a number of stars. Here, a character with a high rarity is set with an ability parameter or the like that is advantageous in a game (such as a quest).

Evolution fusion information includes the character ID of an evolved character, the cost required to evolve into that evolved character (the cost associated in advance with the character), and the add time. The cost includes the character ID of an evolution resource character or a number of coins. For example, the cost for evolving character K into an evolved character L includes the character IDs of character A and character B, which are evolution resource characters, and "2000," which is the number of coins required. The add time includes the time at which a character can be evolved into an evolved character through a future game update (when evolution becomes permissible). This time may include, for example, any date and time between the present and one month in the future. Note that a character may have a plurality of evolution destinations (evolved characters). In this case, the evolution fusion information includes the character ID and cost of each evolved character.

Lottery game information 50C is stored for each lottery game in association with the lottery game ID of the lottery game. The lottery game information 50C includes the lottery game name and price, lottery target information, and the like.

Price includes the number of items consumed in order to execute the lottery game one time. For example, the price for a certain lottery game is five paid stones.

Lottery target information includes the character IDs of the characters constituting the lottery target character group of a lottery game, and the appearance frequency (weighting) associated with that character ID. For example, 100 types of characters may constitute a lottery target character group. Their appearance frequency may be represented by a number from 1 to 10, for example. The appearance frequency is set to a low numerical value for a character with a high rarity, and to a high numerical value for a character with a low rarity. A character (pickup character) that appears more frequently than other characters within the same rarity may be provided. Here, the probability of drawing one character is a value obtained by dividing the appearance frequency set for that one character by the total value of the appearance frequencies set for the characters that constitute the lottery target. For example, if the appearance frequency set for one character is 2 and the total value of the appearance frequencies set for the characters that constitute the lottery target is 400, the probability of drawing that one character is 2/400 (0.5%).

Quest information 50D is stored for each quest in association with the quest ID of that quest. The quest information 50D includes the quest name, consumed stamina value, enemy character information, clearance reward information, and the like.

Consumed stamina value includes the value required to execute the quest. This consumed stamina value is deducted from the player's current stamina value, and the higher the difficulty of the quest, the higher the consumed stamina value is, for example.

Enemy character information includes character IDs and ability parameters of the enemy characters that appear in a quest.

Clearance reward information includes the number of unpaid items (such as free stones) and coins that can be earned when a quest is cleared, the character IDs and drop rates of enemy characters (evolution resource characters) that can be earned, player experience points, and so forth. The drop rate is the probability that the player will earn an enemy character (evolution resource character), and the higher the difficulty of a quest, the higher this probability is.

The extraction unit 52 is a functional unit for extracting characters (content) that satisfy specific conditions. In one or more embodiments, the extraction unit 52 extracts, from among the characters possessed by the player (possessed content), an existing character (content) to which an evolved character (evolved content), which is a new evolution destination, will be added through a future game update. For example, the extraction unit 52 refers to the possessed character information in the player information 50A and the add time of the evolution fusion information in the character information 50B, and extracts, from among the player's possessed characters, an existing character to which an evolved character, which is a new evolution destination, will be added through a game update that will occur within one month from the present time.

The acquisition unit 54 is a functional unit for acquiring various kinds of information. In one or more embodiments, the acquisition unit 54 acquires the cost required to evolve a character (content) extracted by the extraction unit 52 into an evolved character (evolved content). For example, the acquisition unit 54 refers to the evolution fusion information in the character information 50B, and acquires the cost (number of evolution resource characters and coins) required to evolve the extracted character into an evolved character.

The control unit 56 is a functional unit for controlling the entire game. In one or more embodiments, the control unit 56 displays a notification screen for notifying the player of the cost acquired by the acquisition unit 54 prior to a game update. This cost may include an evolution resource character (evolution resource content), for example.

For instance, the notification screen may include an instruction area for transitioning to a play screen for a game event (such as a lottery game or a quest) in which evolution resource characters included in the cost acquired by the acquisition unit 54 can be earned.

Also, for example, the notification screen may include an area indicating that an evolution resource character included in the cost acquired by the acquisition unit 54 is required to evolve the character extracted by the extraction unit 52. In other words, the notification screen may include an area showing the extracted character (possessed character) and the evolution resource characters required to evolve that character after a future game update.

Also, for example, the notification screen may include an area indicating that an evolution resource character included in the cost acquired by the acquisition unit 54 is required to evolve some of the player's possessed characters. In other words, the notification screen may not show the characters (possessed characters) extracted by the extraction unit 52, but may include an area that does show the evolution resource characters required to evolve some of the possessed characters after a future game update.

Also, when evolution resource characters included in the cost acquired by the acquisition unit 54 are lacking from the player's possessed characters, the control unit 56 may display a notification screen indicating that the evolution resource characters are lacking. For example, if the evolution resource characters included in the cost are character A and character B, the control unit 56 may display a notification screen indicating that character B is lacking when the characters possessed by the player include character A but not character B. This notification screen may indicate that character A is sufficient.

Processing Flow

Specific Example 1

Figure 5:
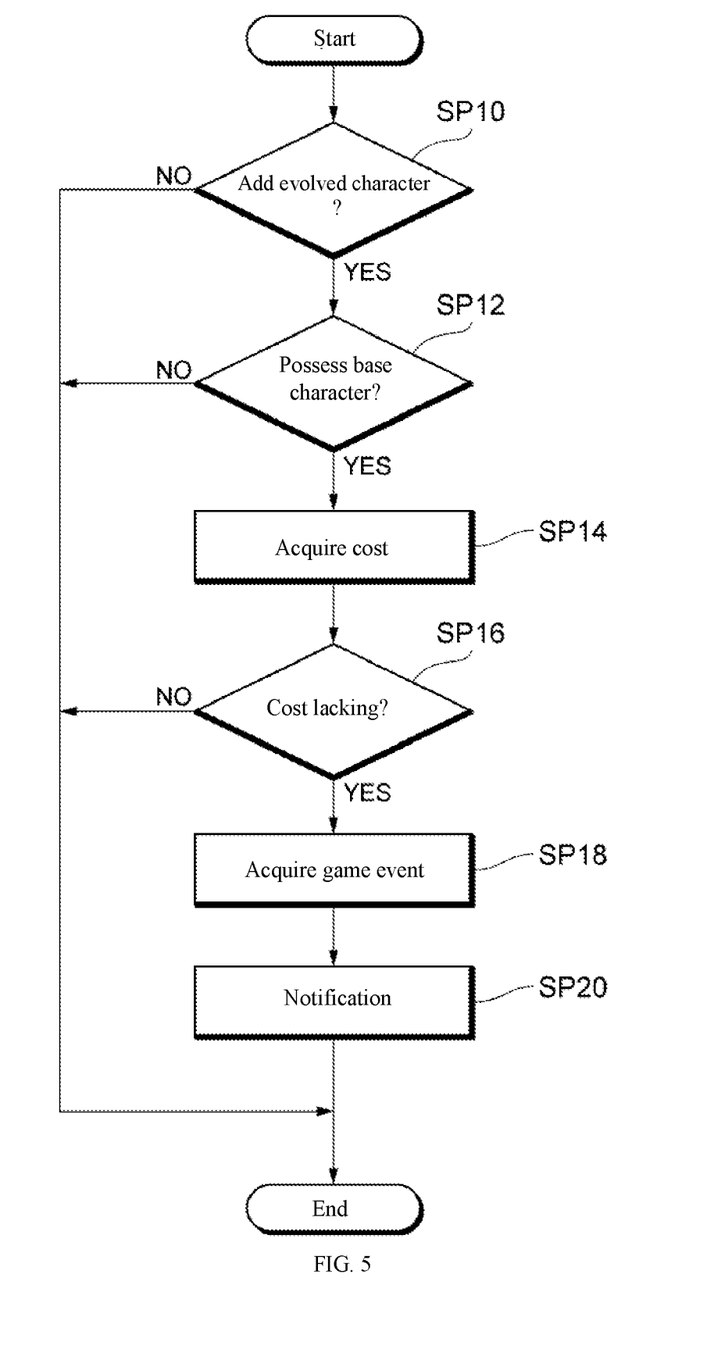
FIG. 5 is a flowchart showing an example (specific example 1) of the flow of processing performed by each of the functional units shown in FIG. 4 in the game system according to one or more embodiments.

FIG. 5 is a flowchart showing an example (specific example 1) of the flow of processing performed by each of the functional units shown in FIG. 4 in the game system according to one or more embodiments. Also, the processing of the following steps is commenced, for example, at the point when the player logs into a game. The order and details of the following steps can be changed as needed.

Step SP10

The extraction unit 52 determines whether or not there is an evolved character to be added through a future game update. For example, the extraction unit 52 refers to the add time of the evolution fusion information in the character information 50B, and extracts a character (base character) that will be able to evolve into an evolved character within one month from the present time from among the characters. If one or more characters can be extracted, the determination is positive. Then, if this determination is positive, the processing moves to the processing of step SP12. On the other hand, if the determination is negative, the processing ends the processing series shown in FIG. 5.

Step SP12

The extraction unit 52 determines whether or not the player possesses the character (base character) extracted in step SP10. For example, the extraction unit 52 refers to the possessed character information of the player information 50A, and if one or more characters homologous to the character extracted in step SP10 can be extracted, the determination is positive. Then, if the determination is positive, the processing moves to the processing of step SP14. On the other hand, if the determination is negative, the processing ends the processing series shown in FIG. 5.

Step SP14

The acquisition unit 54 acquires the cost required to evolve the character (possessed character) extracted in step SP12 into an evolved character that will be added through a future game update. For example, the acquisition unit 54 refers to the evolution fusion information in the character information 50B and acquires the cost required to evolve the extracted character into that evolved character. Then, the processing moves to the processing of step SP16.

Step SP16

The control unit 56 determines whether some or all of the cost acquired in step SP14 is lacking from the player's possessed content. For example, the control unit 56 refers to the possessed content information of the player information 50A, and makes a positive determination if the player does not possess some or all of the cost. Then, if the determination is positive, the processing moves to the processing of step SP18. On the other hand, if the determination is negative, the processing ends the processing series shown in FIG. 5.

Step SP18

The acquisition unit 54 acquires a game event in which the lacking cost can be earned in step SP16. For example, the acquisition unit 54 may refer to the lottery target information of the lottery game information 50C, and may acquire a lottery game in which an evolution resource character that is the lacking cost is included in the lottery target character group. Also, for example, the acquisition unit 54 may refer to the clearance reward information of the quest information 50D, and may acquire a quest including an enemy character in which an evolution resource character, which is the lacking cost, can be earned. Also, for example, the acquisition unit 54 may refer to the clearance reward information of the quest information SOD and may acquire a quest in which coins (lacking coins), which are the lacking cost, can be earned. Then, the processing moves to the processing of step SP20.

Step SP20

The control unit 56 causes the touch panel 32 to display a notification screen including some or all of the cost determined to be lacking in step SP16 and the game events in which the cost acquired in step SP18 can be earned.

Figure 6:
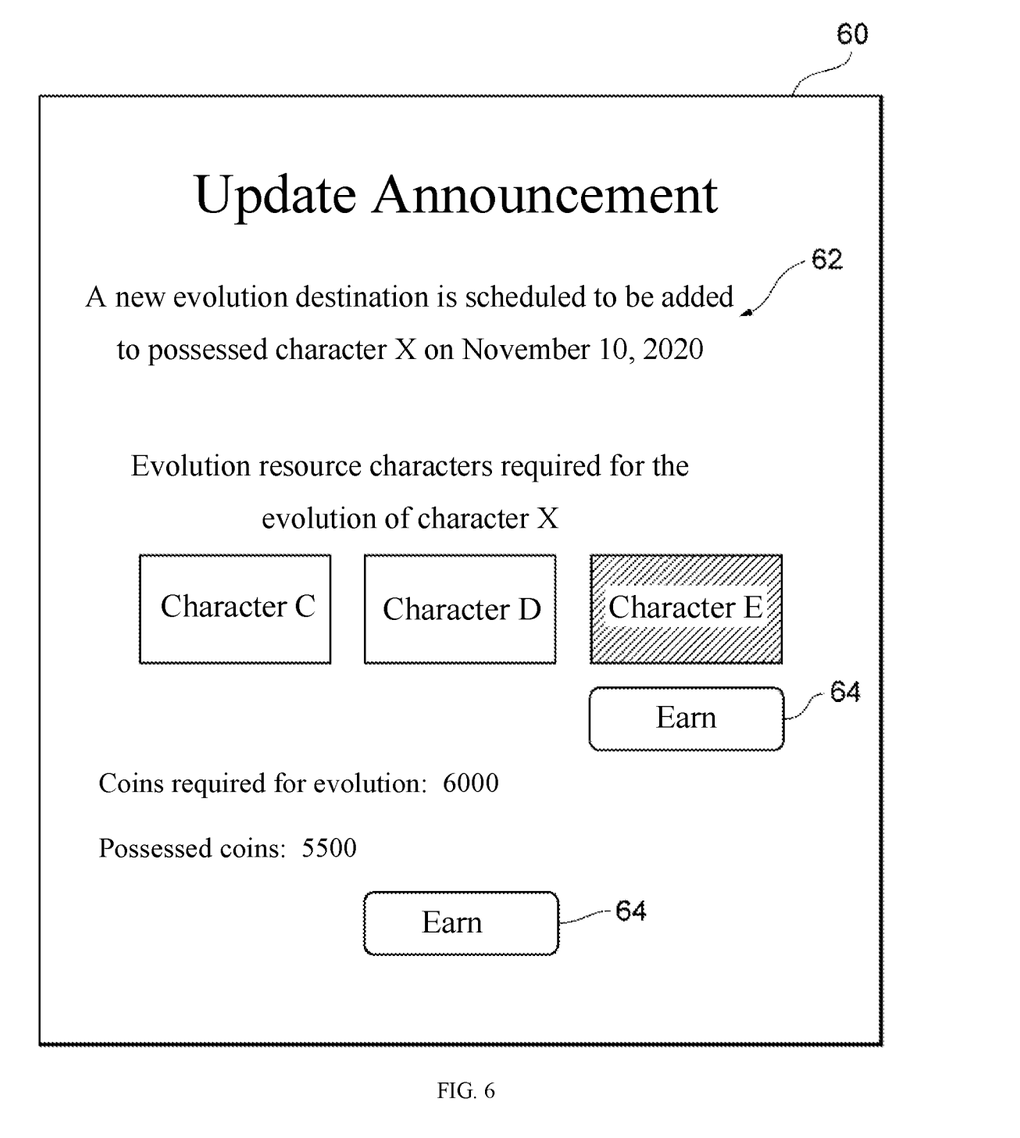
FIG. 6 is a diagram showing an example (specific example 1) of a notification screen according to one or more embodiments.

FIG. 6 is a diagram showing an example (specific example 1) of the notification screen 60 according to one or more embodiments.

As shown in FIG. 6, the notification screen 60 is provided with a notification information area 62 and an instruction area 64. The notification information area 62 indicates that a new evolution destination is scheduled to be added to the character (base character) extracted in step SP12, and shows the number of evolution resource characters and coins that are the cost required for the evolution of that character. Also, in the notification information area 62, any evolution resource characters that are lacking from among the player's possessed characters are displayed in a different manner (such as grayed out) from the evolution resource characters that are not lacking (that are sufficient). The instruction area 64 is an instruction button for transitioning to a play screen of a game event in which the cost (evolution resource characters or coins) acquired in step SP18 can be earned. When this instruction button is pressed, for example, the screen may transition to a screen for executing a certain quest or a certain lottery game.

Then, the processing ends the processing series shown in FIG. 5.

Specific Example 2

In specific example 1 above, in step SP20, the control unit 56 displayed a notification screen indicating the cost required for the evolution of the character (base character) extracted in step SP12 prior to a game update, but the control unit 56 may instead display a notification screen that includes a message recommending the player to play a game event in which the cost can be earned prior to a game update. In other words, the control unit 56 may cause the touch panel 32 to display a notification screen including the game events in which the cost acquired in step SP18 can be earned.

Figure 7:
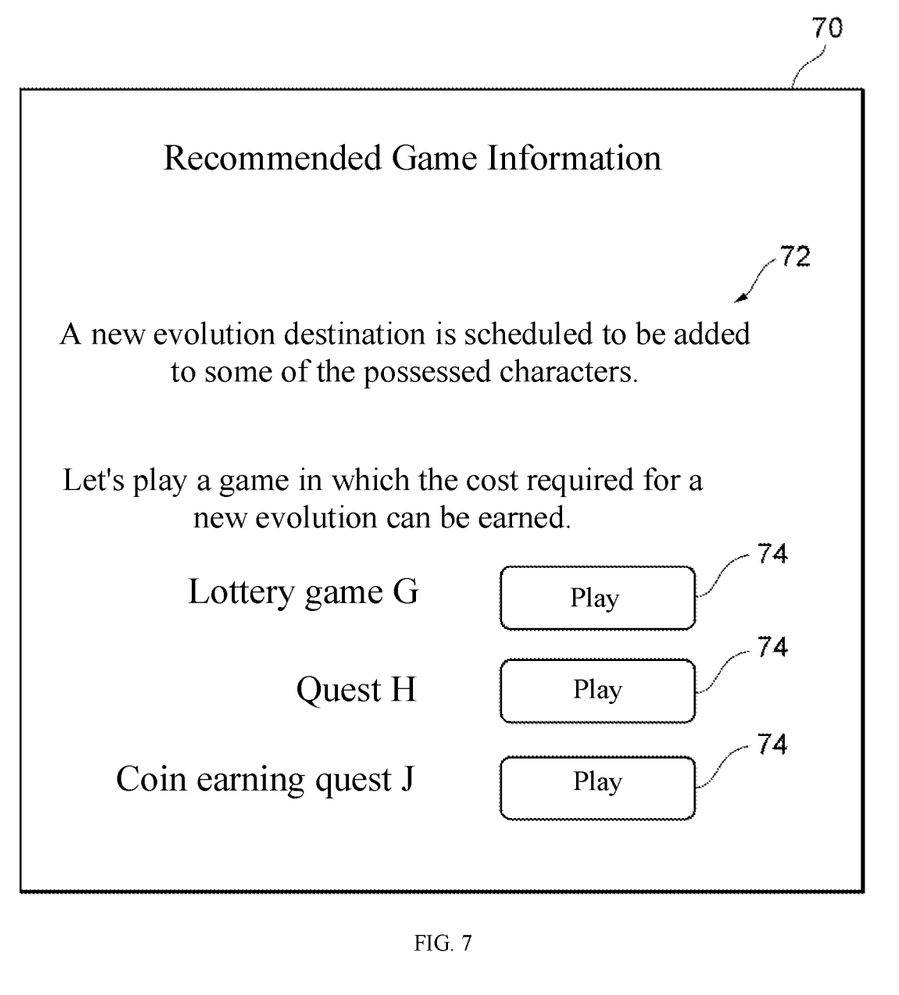
FIG. 7 is a diagram showing an example (specific example 2) of a notification screen according to one or more embodiments.

FIG. 7 is a diagram showing an example (specific example 2) of the notification screen 70 according to one or more embodiments.

As shown in FIG. 7, the notification screen 70 is provided with a notification information area 72 and an instruction area 74. The notification information area 72 indicates that a new evolution destination is scheduled to be added to some of the possessed characters, and shows the game events in which the cost required for a new evolution can be earned. The instruction area 74 is an instruction button for transitioning to a play screen of a game event in which the cost (evolution resource characters or coins) can be earned.

Specific Example 3

In specific example 1 above, in step SP16, the control unit 56 determined whether some or all of the cost acquired in step SP14 was lacking, but the cost may include the value of a specific parameter required to make a resource character into an evolution resource. In this case, the cost of the evolution fusion information in the character information 50B includes the value of the specific parameter required to make each evolution resource character, which is the cost, into an evolution resource. For example, the cost in order to evolve character Y into character Z may include the character IDs of character C and character D, which are evolution resource characters, or may include a specific parameter value of "4" or higher corresponding to character C, a specific parameter value of "5" or higher corresponding to character D, and a number "5000" corresponding to coins. Then, in step SP20, if the specific parameter of an evolution resource character in the player's possessed characters is lower than the value required for evolution, the control unit 56 displays a notification screen indicating that the specific parameter of an evolution resource character is lacking.

Figure 8:
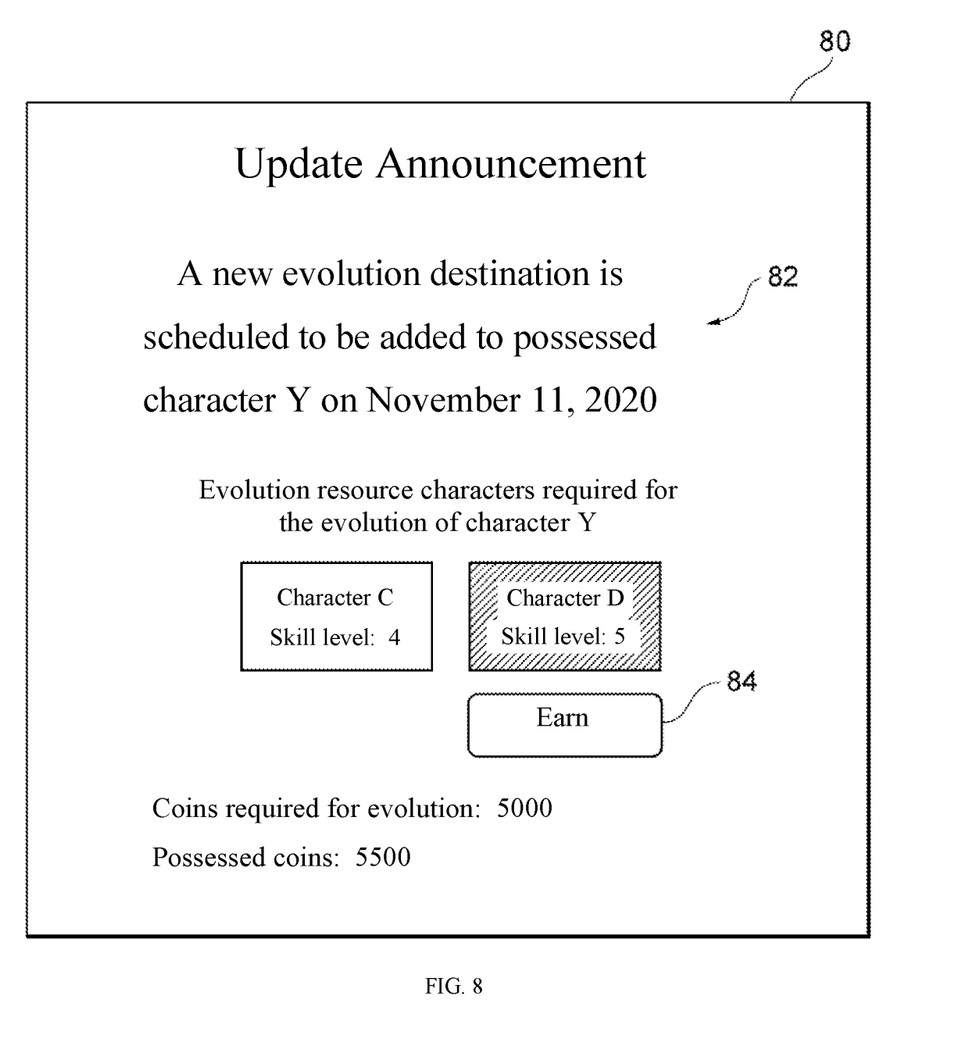
FIG. 8 is a diagram showing an example (specific example 3) of a notification screen according to one or more embodiments.

FIG. 8 is a diagram showing an example (specific example 3) of a notification screen 80 according to one or more embodiments.

As shown in FIG. 8, the notification screen 80 is provided with a notification information area 82 and an instruction area 84. The notification information area 82 indicates that a new evolution destination is scheduled to be added to the character extracted in step SP12, and shows an evolution resource character that is the cost required for the evolution of that character, the specific parameter required for that evolution resource character to become an evolution resource, and the number of coins required for evolution. Also, in the notification information area 82, among the player's possessed characters, any evolution resource characters in which the value of a specific parameter required to become an evolution resource is insufficient are shown in a different manner (such as grayed out) from the evolution resource characters in which the value is not insufficient (is sufficient). The instruction area 84 is an instruction button for transitioning to a play screen of a game event in which a cost (such as an evolution resource character whose specific parameter value is insufficient) can be earned.

As described above, one or more embodiments provide a practical improvement for effective utilization of the updated contents provided by the information processing device. With one or more embodiments of the present invention, the recording medium storing instructions and the information processing device present, to a user, the predetermined information (e.g., the value or cost) necessary for utilizing the updated contents (e.g., the evolved contents) provided by the information processing device. Specifically, in one or more embodiments, a computer is made to function as an extraction unit 52 for extracting, from among a player's possessed content, existing content to which evolved content, which is a new evolution destination, will be added through a future game update, an acquisition unit 54 for acquiring the cost required to evolve the extracted content into the evolved content, and a control unit 56 for displaying a notification screen that notifies the player of the acquired cost prior to a game update.

With this configuration, even if a new evolution destination is added to the player's possessed content through a game update, the player is notified of the cost required for evolution prior to the game update. Therefore, when a new evolution destination is added to the player's possessed content through a game update, that possessed content can be instantly evolved into a new evolution destination.

Also, in one or more embodiments, a computer is made to function as an extraction unit 52 for extracting, from among a player's possessed content, existing content to which evolved content, which is a new evolution destination, will be added through a future game update, an acquisition unit 54 for acquiring the cost required to evolve the extracted content into the evolved content, and a control unit 56 for displaying a notification screen recommending that the player play a game event in which the acquired cost can be earned prior to a game update.

With this configuration, even if a new evolution destination is added to the player's possessed content through a game update, a notification is given, recommending that the player play a game event in which the cost required for evolution can be earned prior to the game update. Therefore, when a new evolution destination is added to the player's possessed content through a game update, that possessed content can be instantly evolved into a new evolution destination.

Also, in one or more embodiments, the cost includes evolution resource content.

With this configuration, the player is notified of the evolution resource content required for the evolution of the possessed content, or is notified of a recommendation to play a game event in which that evolution resource content can be earned prior to the game update, which motivates the player to earn that evolution resource content, and the possessed content can be instantly evolved into a new evolution destination after the game update.

Also, in one or more embodiments, the notification screen includes an instruction area for transitioning to a play screen of a game event in which the evolution resource content can be earned.

With this configuration, the player can easily play a game event in which the evolution resource content can be earned prior to the game update, which motivates the player to earn that evolution resource content, and the possessed content can be instantly evolved into a new evolution destination after the game update.

Also, in one or more embodiments, the notification screen includes an area indicating that the evolution resource content is required to evolve the extracted content.

With this configuration, the player is notified of content from among the player's possessed content that can be evolved through a future game update, so the player can be motivated to earn evolution resource content prior to the game update, and the possessed content can be instantly evolved into a new evolution destination after the game update.

Also, in one or more embodiments, the notification screen includes an area indicating that the evolution resource content is required to evolve some of the possessed content.

With this configuration, the player is notified that some of the player's possessed content can be evolved through a future game update, which makes the game more interesting to the player prior to the game update, while also motivating the player to earn evolution resource content prior to the game update and allowing the possessed content to be instantly evolved into a new evolution destination after the game update.

Also, in one or more embodiments, if evolved resource content is lacking from among the possessed content, the control unit 56 displays a notification screen indicating that the evolved resource content is lacking.

With this configuration, since the player is notified about lacking evolution resource content, the player is motivated to earn the evolution resource content prior to the game update, and the possessed content can instantly be evolved into a new evolution destination after the game update.

Also, in one or more embodiments, the evolution resource content has a specific parameter that rises when homologous content is fused, and when the specific parameter of the evolution resource content in the possessed content is lower than the value required for the evolution, the control unit 56 displays a notification screen indicating that the specific parameter of that evolution resource content is lacking.

With this configuration, since the player is notified about evolution resource content that is lacking a specific parameter, the player is motivated to earn evolution resource content prior to the game update, and the possessed content can be instantly evolved into a new evolution destination after the game update.

Modification Examples

The present invention is not limited to or by the above specific examples. That is, suitable design changes made to the above specific examples by a person skilled in the art are also encompassed by the scope of the present invention as long as they still have the features of the present invention. Also, the elements of the embodiments described above and the modified examples (discussed below) can be combined to the extent that this is technically possible, and these combinations are also encompassed by the scope of the present invention as long as they still have the features of the present invention.

For example, in the above embodiments, the control unit 56 displayed a notification screen indicating that the evolution resource characters were lacking, but a notification screen may be displayed that shows those evolutionary resource characters even if those evolutionary resource characters are not lacking. Also, the notification screen may be provided with an instruction area (instruction button) for transitioning to a play screen of a game event in which evolution resource characters that are not lacking can be earned.

Also, in the above embodiments, the control unit 56 displayed a notification screen recommending that the player play a game event in which the cost required for evolution could be earned prior to the game update, but this notification screen may be displayed if that cost is lacking. Also, the notification screen may be provided with an instruction area (instruction button) for transitioning to a play screen of a game event in which any cost that is lacking (evolution resource characters or coins) can be earned.

Also, in the above embodiments, the control unit 56 displayed a notification screen indicating that a specific parameter of the evolution resource character was lacking, but a notification screen may be displayed that shows the evolution resource character or specific parameter required for becoming an evolution resource even if the specific parameter of the evolution resource character is not lacking. Also, the notification screen may be provided with an instruction area (instruction button) for transitioning to a play screen of a game event in which an evolution resource character with specific parameters that are not lacking can be earned.

In the above embodiments, the control unit 56 displayed the notification screen at the point when the player logged into the game, but the notification screen may instead be displayed upon receiving from the player an instruction to display a menu screen for game events (lottery games or quests), notification information (a notice), an instruction to display a recommended game event, or the like. Also, the control unit 56 may limit the number of times the same notification screen is displayed.

Also, in the above embodiments, characters were mainly used as an example of content, but various items (weapons, armor, jewels, etc.), cards, avatars, coins, points, etc., may also be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (information processing device), 12 . . . terminal device (computer), 50 . . . storage unit, 52 . . . extraction unit, 54 . . . acquisition unit, 56 . . . control unit

What is claimed is:

1. A non-transitory computer readable recording medium storing instructions that present, to a user, predetermined information necessary for utilizing updated contents provided by an information processing device, the instructions causing a computer to execute:
    extracting, from among possessed contents, an existing content to which an evolved content will be added through a game update, wherein the evolved content is an evolution destination of the existing content;
    acquiring, as the predetermined information, a cost required to evolve the existing content into the evolved content; and
    upon determining a lack of the cost in the possessed contents, displaying a notification screen that indicates the lack of the cost, wherein
    the cost includes an evolution resource content,
    the evolution resource content in the possessed content has a specific parameter that rises once a homologous content is fused, and
    the instructions cause the computer to execute:
        under a condition that the specific parameter is lower than a value required for the evolving, causing the notification screen to indicate a lack of the specific parameter.

2. The non-transitory computer readable recording medium according to claim 1, wherein
the cost includes an evolution resource content.

3. The non-transitory computer readable recording medium according to claim 2, wherein
the notification screen includes an instruction area that receives an instruction to transit to a play screen of a game event in which the user can earn the evolution resource content.

4. The non-transitory computer readable recording medium according to claim 2, wherein
the notification screen includes an area indicating that the evolution resource content is required to evolve the existing content.

5. The non-transitory computer readable recording medium according to claim 2, wherein
the notification screen includes an area indicating that the evolution resource content is required to evolve at least one of the possessed contents.

6. The non-transitory computer readable recording medium according to claim 2, wherein
the instructions cause the computer to execute:
upon determining a lack of the evolution resource content in the possessed contents, causing the notification screen to indicate the lack of the evolution resource content.

7. The non-transitory computer readable recording medium according to claim 1, wherein
the instructions cause the computer to execute:
causing, prior to the game update, the notification screen to notify the user of the cost.

8. An information processing device that provides updated contents and presents, to a user, predetermined information necessary for utilizing the updated contents, the information processing device comprising:
a control device that executes:
extracting, from among possessed contents, an existing content to which an evolved content will be added through a game update, wherein the evolved content is an evolution destination of the existing content;
acquiring, as the predetermined information, a cost required to evolve the existing content into the evolved content; and
upon determining a lack of the cost in the possessed contents, displaying a notification screen that indicates the lack of the cost, wherein
the cost includes an evolution resource content,
the evolution resource content in the possessed content has a specific parameter that rises once a homologous content is fused, and
the control device further:
under a condition that the specific parameter is lower than a value required for the evolving, causes the notification screen to indicate a lack of the specific parameter.

* * * * *